United States Patent [19]

Speer et al.

[11] Patent Number: 5,399,289
[45] Date of Patent: Mar. 21, 1995

[54] COMPOSITIONS, ARTICLES AND METHODS FOR SCAVENGING OXYGEN WHICH HAVE IMPROVED PHYSICAL PROPERTIES

[75] Inventors: Drew V. Speer, Columbia; Charles R. Morgan, Brookeville; William P. Roberts, Columbia, all of Md.; Ram K. Ramesh, Greer, S.C.

[73] Assignee: W. R. Grace & Co.-Conn., New York, N.Y.

[21] Appl. No.: 955,547

[22] Filed: Oct. 1, 1992

[51] Int. Cl.$^6$ .................. C09K 15/02; C09K 15/04
[52] U.S. Cl. ..................... 252/188.28; 252/400.1; 252/384; 252/389.1
[58] Field of Search ............. 252/188.28, 400.1, 384, 252/389.1

[56] References Cited

U.S. PATENT DOCUMENTS

| | | | |
|---|---|---|---|
| 3,935,941 | 1/1976 | Potts | 260/23 H |
| 4,908,151 | 3/1990 | Inoue | 252/188.28 |
| 4,983,651 | 1/1991 | Griffin | 524/47 |
| 5,211,875 | 5/1993 | Speer et al. | 252/188.28 |
| 5,286,407 | 2/1994 | Inoue et al. | 252/188.28 |

FOREIGN PATENT DOCUMENTS

| | | |
|---|---|---|
| 0301719 | 2/1989 | European Pat. Off. . |
| 0366254 | 5/1990 | European Pat. Off. . |
| 0367390 | 5/1990 | European Pat. Off. . |
| 0367835 | 5/1990 | European Pat. Off. . |
| 0370802 | 5/1990 | European Pat. Off. . |
| 0380319 | 8/1990 | European Pat. Off. . |
| 2247431 | 3/1992 | United Kingdom . |
| WO90/00504 | 1/1990 | WIPO . |
| WO90/00578 | 1/1990 | WIPO . |

OTHER PUBLICATIONS

Application of 'Active Packaging' for Improvement of Shelf Life and "Nutritional Quality of Fresh and Extended Shelf-Like Foods", Labuza and Breene, *Journal of Food Processing and Preservation*, vol. 13, pp. 1–69 (1989).
"Ageless$^R$--A New Age in Food Preservation" (date unknown), Mitsubishi Gas Chemical Company, Inc.
Kagiya and Takemoto, *J. Macromol. Sci.-Chem*, A, 1976, 10 (5), 795–810 Goto, K. *Plastics* (Special Issue), 1991, 42(10), 83–8, 94.
Rabek, Luck, and Ranby, B., *European Polymer Journal*, 1979, 1089–1110 *Encycl. Polymer Sci. Eng.*, vol. 4, pp. 637–644.
"Delayed Action Photo-Activator for the Degradation of Packaging Polymers", *Polymers & Ecological Problems*, Plenum Press, 1973, pp. 27–43.
"Metal-Catalyzed Oxidations of Organic Compounds", Academic Press, New York 1981.

*Primary Examiner*—Richard D. Lovering
*Assistant Examiner*—Joseph D. Anthony
*Attorney, Agent, or Firm*—Valerie E. Looper

[57] ABSTRACT

A composition for scavenging oxygen is disclosed. The composition comprises an ethylenically unsaturated hydrocarbon polymer which has 0.01–1.0 equivalents of carbon-carbon double bonds per 100 g of polymer and a transition metal catalyst and can be incorporated into various types of layers. The composition has an elongation-at-break of at least 20% and retains at least 50% of its original tensile strength after oxygen scavenging has occurred.

4 Claims, No Drawings

COMPOSITIONS, ARTICLES AND METHODS FOR SCAVENGING OXYGEN WHICH HAVE IMPROVED PHYSICAL PROPERTIES

FIELD OF THE INVENTION

The invention generally relates to compositions, articles and methods for scavenging oxygen in environments containing oxygen-sensitive products, particularly food and beverage products. As will be evident from the disclosure below, the term "oxygen scavenger" refers to compositions, articles or the like which consume, deplete or reduce the amount of oxygen from a given environment. The oxygen scavengers of this invention exhibit improved retention of their physical properties such as elongation and tensile strength, thereby extending their useful lifetime.

BACKGROUND

It is well known that regulating the exposure of oxygen-sensitive products to oxygen maintains and enhances the quality and "shelf-life" of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and having to restock inventory. In the food packaging industry, several means for regulating oxygen exposure have already been developed. These means include modified atmosphere packaging (MAP) and oxygen barrier film packaging.

One method currently being used is through "active packaging," whereby the package for the food product is modified in some manner to regulate the food product's exposure to oxygen. See Labuza and Breene, "Application of 'Active Packaging' for Improvement of Shelf Life and Nutritional Quality of Fresh and Extended Shelf-Life Foods," *Journal of Food Processing and Preservation*, Vol. 13, pp. 1–69 (1989). The inclusion of oxygen scavengers within the cavity of the package is one form of active packaging. Typically, such oxygen scavengers are in the form of sachets which contain a composition which scavenges the oxygen through oxidation reactions. One sachet contains iron-based compositions which oxidize to their ferric states. Another type of sachet contains unsaturated fatty acid salts on a particulate adsorbent. See U.S. Pat. No. 4,908,151. Yet another sachet contains metal/polyamide complex. See PCT Application 90/00578.

However, one disadvantage of sachets is the need for additional packaging operations to add the sachet to each package. A further disadvantage arising from the iron-based sachets is that certain atmospheric conditions (e.g., high humidity, low $CO_2$ level) in the package are sometimes required in order for scavenging to occur at an adequate rate.

Another means for regulating the exposure to oxygen involves incorporating an oxygen scavenger into the packaging structure itself. Through the incorporation of the scavenging material in the package itself rather than by addition of a separate scavenger structure (e.g., a sachet) to the package, a more uniform scavenging effect throughout the package is achieved. This may be especially important where there is restricted air flow inside the package. In addition, such incorporation can provide a means of intercepting and scavenging oxygen as it is passing through the walls of the package (herein referred to as an "active oxygen barrier"), thereby maintaining the lowest possible oxygen level throughout the package.

One attempt to prepare an oxygen-scavenging wall involves the incorporation of inorganic powders and/or salts. See European Applications 367,835; 366,254; 367,390; and 370,802. However, incorporation of these powders and/or salts causes degradation of the wall's transparency and mechanical properties such as tear strength. In addition, these compounds can lead to processing difficulties, especially in the fabrication of thin layers such as thin films. Even further, the scavenging rates for walls containing these compounds appear to be unsuitable for many commercial oxygen-scavenging applications, e.g. such as those in which sachets are employed.

The oxygen scavenging systems disclosed in European Applications 301,719 and 380,319 as well as disclosed in PCT 90/00578 and 90/00504 illustrate another attempt to produce an oxygen-scavenging wall. These patent applications disclose incorporating a metal catalyst-polyamide oxygen scavenging system into the package wall. However, this system does not exhibit oxygen scavenging at a commercially feasible rate, i.e., a rate suitable for creating an internal oxygen level of less than 0.1% (starting with air) within a period of four weeks or less at room temperature, as is typically required for headspace oxygen scavenging applications. See Mitsubishi Gas Chemical Company, Inc.'s literature titled "AGELESS® -A New Age in Food Preservation" (date unknown).

Further, in regards to the incorporation of the polyamide/catalyst system into the package wall, polyamides are typically incompatible with the thermoplastic polymers, e.g. ethylene-vinyl acetate copolymers and low density polyethylenes, typically used to make flexible package walls. Even further, when polyamides are used by themselves to make a flexible package wall, they may result in inappropriately stiff structures. Polyamides also incur processing difficulties and higher costs when compared with the costs of thermoplastic polymers typically used to make flexible packaging. Even further, they are sometimes difficult to heat seal. Thus, all of these are factors to consider when selecting materials for packages, especially flexible packages and when selecting systems for reducing oxygen exposure of packaged products.

U.S. Pat. Nos. 3,935,141 (Potts et al.) and 4,983,651 (Griffin), and references cited therein, disclose polymeric compositions which are environmentally degradable materials, i.e., materials designed to undergo total loss of elongation and tensile strength, after the useful lifetime of the package, upon weathering. In Potts (Column 12, line 13), reduction in elongation-at-break to below 20% results in the embrittlement of polyethylene. Such materials (column 1, line 68 through column 2, line 6) "undergo high levels of multifaceted crazing, followed by cracking and ultimately resulting in particulate formation". This strongly implies that along with a loss in elongation, a complete loss of tensile strength occurs. Griffin more extensively describes such loss of tensile strength as (column 6, line 20) "so low that it could not be measured in the customary equipment", and he reiterates that (column 8, line 8) "loss in tensile strength and the reduction of elongation-at-break . . . are commonly observed consequences of . . . oxidative degradation".

On the other hand, loss of tensile strength does not always accompany a loss in elongation-at-break. In such cases the dominant reaction is crosslinking rather than polymer chain scission. See Kagiya, V. T. and Takemoto, K., *J. Macromol. Sci.-Chem.*, A, 1976, 10(5), 795–810, and Goto, K., Plastics (Special Issue), 1991, 42(10), 83-8, 94. In the case of 1,2polybutadiene crosslinking is by far the most dominant reaction, whereas even 1,4-polybutadiene shows significant chain scission. See Rabek, J. F., Luck, J., and Ranby, B, *European Polymer Journal,* 1979, 1089–1110.

The oxygen scavengers suitable for commercial use in films of the present invention are disclosed in copending U.S. Ser. No. 679,419 filed Apr. 2, 1991, and a method of initiating oxygen scavenging generally is disclosed in U.S. Ser. No. 722,067, filed Jun. 27, 1991. Both applications are incorporated herein by reference as if set forth in full.

Losses in tensile strength and elongation are often found as a result of the oxidation of polymers, and are associated with polymer chain scission and crosslinking processes (see *Encycl. Polym. Sci. Eng.*, Volume 4, pp 637–644). Such losses of elongation and tensile strength are most extensively described in terms of their application to environmentally degradable packaging materials (see U.S. Pat. Nos. 3,935,141 and 4,983,651, and Scott, G., "Delayed Action Photo-Activator for the Degradation of Packaging Polymers", *Polymers & Ecological Problems*, Plenum Press, 1973, pp 27–43). Such changes in physical properties will lead to losses in impact strength, flex cracking resistance, etc., which are not desirable during the useful lifetime of the package. Use of the additional layers in the package may partly circumvent these effects; however, for the best package performance, materials are needed which do not undergo these losses, while scavenging useful quantities of oxygen. It has been discovered that certain polymers and polymer blends with useful scavenging properties will also retain good physical properties during the lifetime of the package.

SUMMARY OF THE INVENTION

It is an object of the invention to provide organic materials which are capable of rapidly scavenging oxygen while retaining important physical properties such as tensile strength and elongation during the course of the package lifetime.

Specifically, it is an object of this invention to provide readily processable polymeric materials, which are capable of scavenging at least 10 cc $O_2$/g (230 cc $O_2/(m^{2\circ}mil)$) in one month when in the form of a thin layer (0.1–20 mils). Such materials would exhibit an elongation-at-break of at least 20% (ASTM D882), and would retain at least 50% of their original tensile strength after such oxygen scavenging has occurred.

It is a further object of this invention to incorporate these materials into packages for the purpose of reducing or preventing oxygen entry into the package, and/or reducing the amount of oxygen present in the package by means of the above-mentioned oxygen scavenging process. The advantage of using the materials to produce packages is that key physical properties (e.g., impact strength) are maintained throughout the useful lifetime of the packet.

The above-mentioned objects are obtained from a novel composition comprising:

(a) an ethylenically unsaturated hydrocarbon polymer having 0.01–1.0 equivalents of double bonds per 100 grams of polymer and
(b) a transition metal catalyst.

When the composition is incorporated into a layer such as a film layer, novel articles for packaging oxygen-sensitive products can be prepared therefrom. The articles used in those methods limit the oxygen exposure by acting as an active oxygen barrier and/or acting as means for scavenging oxygen from within the article, and retain acceptable physical properties for a longer period of time.

The above-mentioned goals and others will be apparent from the description that follows.

DESCRIPTION OF THE INVENTION

The invention can be used in packaging articles having several forms. Suitable articles include, but are not limited to, rigid containers, flexible bags, or combinations of both. Typical rigid or semi-rigid articles include plastic, paper or cardboard cartons or bottles such as juice containers, soft drink containers, thermoformed trays or cups which have wall thicknesses in the range of 100 to 1000 micrometers. Typical flexible bags include those used to package many food items, and will likely have thicknesses of 5 to 250 micrometers. In addition the walls of such articles often comprise multiple layers of material. This invention can be used in one, some or all of those layers.

Though it may be preferable from the standpoint of packaging convenience and/or scavenging effectiveness to employ the invention as an integral part of the package wall, the invention can also be used as a nonintegral packaging component, e.g. coatings, bottle cap liners, adhesive or non-adhesive sheet inserts, sealants or fibrous mat inserts.

Besides packaging articles for food and beverage, Packaging for other oxygen-sensitive products can benefit from the invention. Such products would be pharmaceuticals, oxygen sensitive medical products, corrodible metals or products such as electronic devices, etc.

The ethylenically unsaturated hydrocarbon (a) may be either substituted or unsubstituted. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight.

Preferred examples of unsubstituted ethylenically unsaturated hydrocarbons include, but are not limited to, diene polymers such as polyisoprene, (e.g., transpolyisoprene), polybutadiene (especially 1,2-polybutadienes, which are defined as those polybutadienes possessing greater than or equal to 50% 1,2microstructure), and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as β-carotene.

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates.

The composition used may also comprise a mixture of two or more of the substituted or unsubstituted ethylenically unsaturated hydrocarbons described above.

As will also be evident, ethylenically unsaturated hydrocarbons which are appropriate for forming solid transparent layers at room temperature are preferred for scavenging oxygen in the packaging articles described above. For most applications where transparency is necessary, a layer which allows at least 50% transmission of visible light is acceptable.

The oxygen scavenging compositions comprise a polymeric component and a transition metal component, wherein the polymeric component comprises at least 90% of the composition by weight, and contains at least one ethylenically unsaturated polymer. Taken as a whole, the polymeric component contains 0.01–1.0 equivalents of carbon-carbon double bonds per 100 g of polymer on average.

The most preferred ethylenically unsaturated polymer previously disclosed in copending applications U.S. Ser. No. 679,419 and 722,067 was 1,2-polybutadiene. If undiluted, it contains approximately 1.85 equivalents of double bonds per 100 g, and it undergoes a near total loss in elongation-at-break upon scavenging oxygen, but retains substantially its tensile strength.

It has been discovered that by limiting the average double bond content of the polymeric component, it is possible to retain both scavenging properties and physical properties. Polymers having this reduced double bond content can be homopolymers, copolymers, and/or polymer blends. Polymer blends may be especially desirable, because it may be desirable to have the majority of double bonds present in a discontinuous phase, since a change in physical properties in the discontinuous phase would have relatively less of an effect on the overall physical properties of the blend, which would be dominated by the continuous phase.

Suitable examples of homopolymer are poly(octenamer), which has 0.91 equivalents of double bonds per 100 g, and poly(4-vinylcyclohexene), which has 0.93 equivalents of double bonds per 100 g.

Suitable examples of copolymers include $C_1$ to $C_4$ alkyl acrylates and methacrylates. Other examples include copolymers derived from 1,3-butadiene, isoprene, 5-ethylidene-2-norbornene, 4-vinylcyclohexene, 1,4-hexadiene, 1,6-octadiene, etc., with one or more vinyl monomer such as ethylene, propylene, styrene, vinyl acetate, and/or other alpha olefins. A specific example is a terpolymer of ethylene, propylene, and 5-ethylidene-2-norbornene. Such EPDM elastomers typically contain from 3–14% by weight 5-ethylidene-2-norbornene. Such polymers are within the requirement of 0.01–1.0 equivalents of double bonds per 100 g of polymer.

Also suitable are partially hydrogenated ethylenically unsaturated polymers (e.g. polybutadiene) with at least about 50% of the double bonds hydrogenated.

Examples of polymer blends are numerous. Especially preferred are blends of EPDM with 20–40% polybutadiene, EPDM with 20–40% poly(octenamer), and 50/50 blends of polybutadiene with saturated polyolefins.

As indicated above, (b) is a transition metal catalyst. While not being bound by any particular theory, suitable metal catalysts are those which can readily interconvert between at least two oxidation states. See Sheldon, R. A.; Kochi, J. K.; "Metal-Catalyzed Oxidations of Organic Compounds" Academic Press, New York 1981.

Preferably, (b) is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, 2-ethylhexanoate, neodecanoate or naphthenate. Particularly preferable salts include cobalt (II) 2-ethylhexanoate and cobalt (II) neodecanoate. The metal salt may also be an ionomer, in which case a polymeric counterion is employed. Such ionomers are well known in the art.

When making layers, such as film layers, from compositions wherein (a) is a polymeric compound such as polybutadiene, polyisoprene or copolymers thereof or polypentenamer, etc., the layer can be prepared directly from (a). On the other hand, (a) and transition metal catalyst (b) may be further combined with one or more polymeric diluents, such as thermoplastic polymers which are typically used to form film layers in plastic packaging articles. Even in the event (a) is a thermoplastic polymer, e.g. polybutadiene, it is sometimes suitable to include one or more additional polymeric diluents. In the manufacture of certain packaging articles well known thermosets can also be used as the polymeric diluent.

Selecting combinations of diluent and (a) depends on the properties desired. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. In rigid articles such as beverage containers PET is often used. See European Application 301,719. Blends of different diluents may also be used. However, as indicated above, the selection of the polymeric diluent largely depends on the article to be manufactured and the end use. Such selection factors are well known in the art.

If a diluent polymer such as a thermoplastic is employed, it should further be selected according to its compatibility with the ethylenically unsaturated hydrocarbon selected for (a). In some instances, the clarity, cleanliness, effectiveness as an oxygen scavenger, barrier properties, mechanical properties and/or texture of the article can be adversely affected by a blend containing a polymer which is incompatible with (a). For instance, it has been found that when (a) is dehydrated castor oil, a less "greasy" film is prepared from a blend with ethyleneacrylic acid copolymer than with ethylene vinyl acetate copolymer.

Further additives may also be included in the composition to impart properties desired for the particular article being manufactured. Such additives include, but are not necessarily limited to, fillers, pigments, dyestuffs, antioxidants, stabilizers, processing aids, plasticizers, fire retardants, antifog agents, etc.

The mixing of the components listed above is preferably accomplished by melt-blending at a temperature in the range of 50° C. to 300° C. However alternatives such as the use of a solvent followed by evaporation may also be employed. The blending may immediately precede the formation of the finished article or preform or precede the formation of a feedstock or masterbatch for later use in the production of finished packaging articles. When making film layers or articles from oxygen-scavenging compositions, (co)extrusion, solvent casting, injection molding, stretch blow molding, orientation, thermoforming, extrusion coating, coating and curing, lamination or combinations thereof would typically follow the blending.

The amounts of (a), (b), optional polymeric diluents and additives, vary depending on the article to be manufactured and its end use. These amounts also depend on the desired oxygen scavenging capacity, the desired oxygen scavenging rate, and the particular materials selected.

For instance, the primary function of (a) is to react irreversibly with oxygen during the scavenging process, and the primary function of (b) is to facilitate this process. Thus, to a large extent, the amount of (a) will affect the oxygen capacity of the composition, i.e., affect the amount of oxygen that the composition can consume, and the amount of (b) will affect the rate at which oxygen is consumed. It also thus follows that the amount of (a) is selected in accordance with the scavenging capacity needed for a particular application, and the amount of (b) is selected in accordance with the scavenging rate needed. Typically, the amount of (a) may range from 1 to 99%, preferably from 10 to 99%, by weight of the composition or layer in which both (a) and (b) are present (herein referred to as the "scavenging component" e g., in a coextruded film, the scavenging component would comprise the particular layer(s) in which (a) and (b) are present together). Typically, the amount of (b) may range from 0.001 to 1% (10 to 10,000 ppm) of the scavenging component, based on the metal content only (excluding ligands, counterions, etc.). In the event the amount of (b) is about 0.5% or less, it follows that (a) and/or the diluent will comprise substantially all of the composition.

If one or more diluent polymers are used, those polymers may comprise, in total, as much as 99% by weight of the scavenging component.

Any further additives employed would normally not comprise more than 10% of the scavenging component., with preferable amounts being less than 5% by weight of the scavenging component.

As mentioned above, the oxygen scavenging composition may be used in a flexible or rigid single layer or multilayer article. The layers comprising the composition may be in several forms. They may be in the form of stock films, including "oriented" or "heat shrinkable" films, which may ultimately be processed as bags, etc. The layers may also be in the form of sheet inserts to be placed in a packaging cavity. In rigid articles such as beverage containers, thermoformed trays or cups, the layer may be within the container's walls. Even further, the layer may also be in the form of a liner placed with or in the container's lid or cap. The layer may even be coated or laminated onto any one of the articles mentioned above.

In multilayered articles, the oxygen scavenging layer may be included with layers such as, but not necessarily limited to, "oxygen barriers" i.e. layers of material having an oxygen transmission rate equal to or less than 500 cubic centimeters per square meter ($cc/m^2$) per day per atmosphere at room temperature, i.e. about 25° C. Typical oxygen barriers comprise poly(ethylene vinyl alcohol), polyacrylonitrile, polyvinyl chloride, poly(vinylidene dichloride), polyethylene terephthalate, silica, and polyamides. Copolymers of certain materials described above, and metal foil layers, can also be employed.

The additional layers may also include one or more layers which are permeable to oxygen. In one preferred embodiment, especially for flexible packaging for food, the layers include, in order starting from the outside of the package to the innermost layer of the package, (i) an oxygen barrier layer, (ii) a layer comprising the invention, i.e. the scavenging component as defined earlier, and optionally, (iii) an oxygen permeable layer. Control of the oxygen barrier property of (i) allows a means to regulate the scavenging life of the package by limiting the rate of oxygen entry to the scavenging component (ii), and thus limiting the rate of consumption of scavenging capacity. Control of the oxygen permeability of layer (iii) allows a means to set an upper limit on the rate of oxygen scavenging for the overall structure independent of the composition of the scavenging component (ii). This can serve the purpose of extending the handling lifetime of the films in the presence of air prior to sealing of the package. Furthermore, layer (iii) can provide a barrier to migration of (a), (b), other additives, or by-products of scavenging into the package interior. Even further, layer (iii) may also improve the heat-sealability, clarity and/or resistance to blocking of the multilayer film.

The multilayered articles can be prepared using coextrusion, coating and/or lamination. In addition to oxygen barrier and oxygen permeable layers, further layers such as adhesive layers may be adjacent to any of the layers listed above. Compositions suitable for adhesive layers include those well known in the art, such as anhydride functional polyolefins.

To determine the oxygen scavenging capabilities of the invention, the rate of oxygen scavenging can be calculated by measuring the time elapsed before the article depletes a certain amount of oxygen from a sealed container. For instance, a film comprising the scavenging component can be placed in an air-tight, sealed container of a certain oxygen containing atmosphere, e.g. air which typically contains 20.6% oxygen by volume. Then, over a period of time, samples of the atmosphere inside the container are removed to determine the percentage of oxygen remaining.

When an active oxygen barrier is required, a useful scavenging rate can be as low as 0.05 cc oxygen ($O_2$) per gram of (a) in the scavenging component per day in air at 25° C and at 1 atmosphere pressure. However, the composition of this invention has the capability of rates equal to or greater than 0.5 cc oxygen per gram of (a) per day, thus making it suitable for scavenging oxygen from within a package, as well as suitable for active oxygen barrier applications. The composition is even capable of more preferable rates equal to or greater than 5.0 cc $O_2$ per gram of (a) per day.

Generally, film layers suitable for use as an active oxygen barrier can have a scavenging rate as low as 1 cc oxygen per square meter per day when measured in air at 25° C. and 1 atmosphere pressure. However, a layer of this invention is capable of a scavenging rate greater than 10 cc oxygen per square meter per day, and preferably has an oxygen scavenging rate equal to or greater than about 25 cc, and more preferably has a scavenging rate of 100 cc oxygen per square meter per day under the same conditions, thus making it suitable for scavenging oxygen from within a package, as well as suitable for active oxygen barrier applications. Under different temperature and atmospheric conditions, the scavenging rates of the composition and layers of the invention will be different. The rates at room temperature and one atmosphere were measured because they best represent the conditions under which the invention will be exposed in many instances.

In an active oxygen barrier application, it is preferable that the combination of oxygen barriers and any oxygen scavenging activity create an overall oxygen transmission rate of less than about 1.0 cubic centimeters, more preferably 0.5 cc and even more preferably less than 0.1 cc oxygen per square meter per day per atmosphere at 25° C. It is also preferable that the oxygen scavenging capacity is such that this transmission rate is not exceeded for at least two days. See European Application 301,719. Another definition of acceptable oxygen scavenging is derived from testing actual packages. In actual use, the scavenging rate requirement will largely depend on the internal atmosphere of the package, the contents of the package and the temperature at which it is stored. In actual use, it has been found that the scavenging rate of the oxygen scavenging article or package should be sufficient to establish an internal oxygen level of less than 0.1% in less than about four weeks. See Mitsubishi literature supra.

In a packaging article according to this invention, the scavenging rate capability will depend primarily on the amount and nature of (a) and (b), and secondarily on the amount and nature of other additives (e.g., diluent polymer, antioxidant, etc.) which are present in the scavenging component, as well as the overall manner in which the package is fabricated, e.g., surface area/volume ratio.

The oxygen scavenging capacity of an article comprising the invention can be measured by determining the amount of oxygen consumed until the article becomes ineffective as a scavenger. The scavenging capacity of the package will depend primarily on the amount and nature of (a) present in the scavenging component.

In actual use, the oxygen scavenging capacity requirement of the article will largely depend on three parameters of each application:

(1) the quantity of oxygen initially present in the package, (2) the rate of oxygen entry into the package in the absence of the scavenging property, and (3) the intended shelf life for the package.

The scavenging capacity of the composition can be as low as 1 cc oxygen per gram, but is preferably at least 10 cc oxygen per gram, and more preferably at least 50 cc oxygen per gram. When such compositions are in a layer, the layer will preferably have an oxygen capacity of at least 250 cc oxygen per square meter per mil thickness and more preferably at least 1200 cc, more preferably 2400 cc oxygen per square meter per mil thickness.

Other factors may also affect oxygen scavenging and should be considered when selecting compositions for the scavenging. These factors include but are not limited to temperature, relative humidity, and the atmospheric environment in the package.

In order to further illustrate the practice of the present invention and the advantages thereof, the following examples are provided. However, these examples are in no way meant to be limitive, but merely illustrative.

Example 1

Preparation of Masterbatch

A masterbatch containing cobalt and benzophenone was prepared by a continuous compounding and pelletizing operation. Thus, a dry blend of poly(ethylene vinylacetate), vinylacetate 9% (EVA-9, Exxon, LD318.92), containing 1.5% by wt. pellets of cobalt catalyst (Cobalt TEN-CEM®, OM Group, Inc., 22.5% cobalt metal by wt.), and 5% benzophenone (Pfaltz & Bauer) was placed in the hopper of a 0.8 inch Welding Engineer's® tangential counter-rotating twin screw extruder, equipped with a four strand die. The resulting strands were fed through a water bath to cool and were dried with an air knife. The strands were then fed into a Killion® pelletizer. The resulting pellets, herein referred to as the "cobalt/benzophenone masterbatch", were then conveniently used in further formulations.

Example 2

Samples for Physical Testing

Samples for physical testing were prepared by melt blending the components in a Brabender® mixing chamber. Films (typically 15–20 mils) were prepared by pressing the resulting materials in a heated lab press. Films were then cut into rectangles with well defined surface areas (about 10×10 cm). Oxygen scavenging was induced by UV irradiation for 5 minutes with an Amergraph blacklight unit (3.2 mW/cm$^2$). Oxygen uptake was monitored by sealing the samples in barrier bags (Cryovac® BDF 2001 film) with 600 cc of air. Small samples (4 cc) were periodically withdrawn via a gas tight syringe through an adhesive septum, and were analyzed using a Mocon® model LC-700F oxygen analyzer. The following formulations were prepared and tested:

I. 90% 1,2-poly(butadiene), JSR, RB830, (available from Japan Synthetic Rubber) and 10% cobalt-/benzophenone masterbatch.

II. 50% 1,2-poly(butadiene), JSR, RB830, 40% poly(ethylene-vinyl acetate), Exxon, LD318.92, and 10% cobalt/benzophenone masterbatch.

III. 90% EPDM, Exxon, Vistalon 3708, and 10% cobalt/benzophenone masterbatch.

IV. 70% EPDM, Exxon, Vistalon 3708, 20% poly-(octenamer), Hüls, Vestenamer 6213, and 10% cobalt/benzophenone masterbatch.

V. 70% EPDM, Exxon, Vistalon 3708, 20% 1,2-poly(-butadiene), JSR, RB830, and 10% cobalt/benzophenone masterbatch.

For each of the formulations above, at various levels of oxidation, an Instron® 4204 equipped with a 50 lb. load cell was used to determine the stress (tensile strength), the strain-at-maximum load, the percent strain-at-failure (elongation-at-break), and Young's modulus (reference ASTM D882). A balanced elastomeric extensometer was used on samples with large elongations. "Dog-bone" specimens were cut using an ASTM D 412.D type C cutter. Triplicates (or more) of each formulation were run. Data was analyzed using Instron's series IX software.

The data in Table 1 indicate that formulation I (1.65 equiv. C=C) fails to maintain >20% elongation-at-break during oxygen scavenging, although it does substantially maintain tensile strength. Formulation II (0.925 equiv. C=C) just maintains >20% elongation-at-break, while maintaining tensile strength. On the other hand, formulations III–V (0.04 to 0.4 equiv. C=C) maintain significantly more than 20% elongation-at-break, and they also maintain at least 50% of their original tensile strength. It can further be seen that formulations IV and V have the best oxygen scavenging properties in combination with the best maintenance of tensile and elongation properties. These data correlate with the double bond content of each formulation, with formulation II falling just inside the desired ranges.

TABLE 1

| Formulation | Equiv. C=C per 100 g | Oxygen Scav. cc $O_2/m^2 \cdot$ mil | Tensile psi | % Strain |
|---|---|---|---|---|
| I | 1.67 | 0 | 2080 | 557 |
| " | " | 258 | 1588 | 28.6 |
| " | " | 524 | 1839 | 6.55 |
| " | " | 808 | 2587 | 11.2 |
| I | 1.67 | 922 | 2505 | 2.4 |
| II | 0.925 | 0 | 2028 | 584 |
| " | " | 390 | 1601 | 50.3 |

TABLE 1-continued

| Formulation | Equiv. C=C per 100 g | Oxygen Scav. cc $O_2/m^2 \cdot$ mil | Tensile psi | % Strain |
|---|---|---|---|---|
| " | " | 572 | 1965 | 35.2 |
| " | " | 664 | 2000 | 27.7 |
| II | 0.925 | 818 | 2223 | 23.9 |
| III | ≦0.042 | 0 | 1106 | 506 |
| " | " | 288 | 921.9 | 303 |
| " | " | 518 | 685.1 | 247 |
| " | " | 522 | 715.8 | 276 |
| III | ≦0.042 | 528 | 626.2 | 237.1 |
| IV | ≦0.21 | 0 | 1382 | 794 |
| " | " | 562 | 846.5 | 353 |
| " | " | 582 | 748.7 | 332 |
| " | " | 684 | 834.8 | 307 |
| IV | ≦0.21 | 692 | 820.6 | 311 |
| V | ≦0.40 | 0 | 2276 | 484 |
| " | " | 174 | 1550 | 246 |
| " | " | 336 | 2242 | 280 |
| " | " | 638 | 1624 | 223 |
| V | ≦0.40 | 730 | 1874 | 230 |

What is claimed:

1. A composition suitable for scavenging oxygen, wherein the composition consists essentially of
   (a) an ethylenically unsaturated hydrocarbon polymer or unsaturated polymer blend which has 0.01–1.0 equivalents of carbon-carbon double bonds per 100 g of the composition,
   (b) a transition metal catalyst and wherein the composition scavenges at least 230 cc oxygen/($m^2$.mil) in thirty days, and also retains at least 50% of tensile strength and 20% of original elongation-at-break after at least 230 cc oxygen/($m^2$.mil) has been absorbed.

2. A composition according to claim 1 wherein (a) is selected from the group consisting of poly(octenamer) and poly(4-vinyl cyclohexene).

3. A composition according to claim 1, wherein (a) is selected from the group consisting of copolymers and terpolymers derived from 1,3-butadiene, isoprene, 5-ethylidene-2-norbornene, 4-vinylcyclohexene or 1,4-hexadiene with one or more polymers from the group consisting of ethylene, propylene, styrene and vinyl acetate.

4. A composition according to claim 1 wherein (a) is selected from the group consisting of terpolymers of ethylene, propylene and 5-ethylidene-2-norbornene.

* * * * *